(12) United States Patent
Ohara

(10) Patent No.: US 8,455,789 B2
(45) Date of Patent: Jun. 4, 2013

(54) ENERGY COLLECTION AND POWER REDUCTION IN LASER COUPLING PROCESS

(75) Inventor: Tetsuo Ohara, Sutton, MA (US)

(73) Assignee: Panasonic Corporation, Osaka (JP)

( * ) Notice: Subject to any disclaimer, the term of this patent is extended or adjusted under 35 U.S.C. 154(b) by 2546 days.

(21) Appl. No.: 11/129,778

(22) Filed: May 16, 2005

(65) Prior Publication Data
US 2006/0255018 A1 Nov. 16, 2006

(51) Int. Cl.
B23K 26/20 (2006.01)

(52) U.S. Cl.
USPC .................................. 219/121.65

(58) Field of Classification Search
USPC ............. 219/121.61, 121.62, 121.84, 121.86, 219/121.6, 121.63–121.72, 121.85
See application file for complete search history.

(56) References Cited

U.S. PATENT DOCUMENTS

| 1,530,441 | A | * | 3/1925 | Thomson | 359/845 |
|---|---|---|---|---|---|
| 3,627,590 | A | | 12/1971 | Mammel | |
| 3,757,078 | A | * | 9/1973 | Conti et al. | 219/121.75 |
| 4,288,678 | A | * | 9/1981 | La Rocca | 219/121.65 |
| 4,480,168 | A | * | 10/1984 | Cielo et al. | 219/121.6 |
| 4,560,100 | A | * | 12/1985 | Hall | 228/40 |
| 4,595,816 | A | * | 6/1986 | Hall et al. | 219/121.64 |
| 4,644,169 | A | * | 2/1987 | Hunt | 250/432 R |
| 4,665,298 | A | * | 5/1987 | La Rocca | 219/121.6 |
| 4,685,608 | A | | 8/1987 | Kujas | |
| 4,803,335 | A | * | 2/1989 | Steen et al. | 219/121.84 |
| 4,864,098 | A | * | 9/1989 | Basanese et al. | 219/121.61 |
| 4,902,531 | A | * | 2/1990 | Nakayama et al. | 427/570 |
| 5,008,024 | A | * | 4/1991 | Watkins | 219/727 |
| 5,013,111 | A | | 5/1991 | Tilly et al. | |
| 5,173,583 | A | * | 12/1992 | de Contencin et al. | 219/121.74 |
| 5,502,743 | A | * | 3/1996 | Conochie et al. | 373/151 |
| 5,643,366 | A | * | 7/1997 | Somekh et al. | 118/729 |
| 5,658,473 | A | * | 8/1997 | Ziemek | 219/121.64 |
| 5,669,979 | A | * | 9/1997 | Elliott et al. | 134/1 |
| 5,814,784 | A | * | 9/1998 | Kinsman et al. | 219/121.6 |
| 5,986,233 | A | * | 11/1999 | Antieau et al. | 219/121.13 |
| 5,993,942 | A | * | 11/1999 | Bakker et al. | 428/192 |
| 6,100,497 | A | * | 8/2000 | Maruyama et al. | 219/121.63 |
| 6,107,597 | A | * | 8/2000 | Staschewski et al. | 219/121.63 |

(Continued)

FOREIGN PATENT DOCUMENTS

| JP | 60235389 A | * | 11/1985 |
| JP | 362050095 A | * | 3/1987 |
| JP | 02194632 A | | 8/1990 |

OTHER PUBLICATIONS

Official Action dated Mar. 3, 2011, U.S. Appl. No. 12/259,723.

Primary Examiner — Samuel M Heinrich
(74) Attorney, Agent, or Firm — RatnerPrestia

(57) ABSTRACT

An energy collector is used to assist a laser coupling process by reducing the amount of output power of a laser that is used to modify a device attaching element. The energy collector includes an energy collector tip configured to be placed proximate to a device attaching element during the laser coupling process. The energy collector tip is configured to receive laser energy reflected from the device attaching element during the laser coupling process and is formed from a material that converts this reflected energy to heat. Sufficient thermal coupling is created between the energy collector and a surface to provide a conductive pathway for the energy, which has been converted to heat, between the energy collector and the device attaching element.

25 Claims, 5 Drawing Sheets

U.S. PATENT DOCUMENTS 7,154,066 B2 * 12/2006 Talwar et al. .............. 219/121.8
7,160,287 B1    1/2007 Siegel
2001/0009251 A1  7/2001 Sekizawa
2008/0230523 A1  9/2008 Graf

* cited by examiner

ENERGY COLLECTION AND POWER REDUCTION IN LASER COUPLING PROCESS

FIELD OF THE INVENTION

The present invention relates generally to an apparatus for assisting in a laser coupling process by reducing the required amount of laser power, and, in particular, to an apparatus for collecting laser energy reflected from a device attaching element and converting the laser energy to heat during the laser coupling and fiber attach process.

BACKGROUND OF THE INVENTION

Laser soldering for attaching multiple components may be used in a variety of systems, including optical systems, electronic systems and micro-mechanical systems, including micro-electro-mechanical systems (MEMS) and micro-opto-electro-mechanical systems (MOEMS). For example, laser soldering may be used to securely position an optical fiber to couple the optical output from a laser diode into the optical fiber during the construction of laser transmitters. Typically, fiber-coupled diode lasers are packaged in metal butterfly packages, which may be gold plated. The fiber is held in alignment with the laser using a device attaching element such as epoxy, a laser weld, or a solder attachment with or without a ferrule. Epoxy attachment is low cost but may have too much thermal expansion for high precision attachments. Furthermore, it may not be reliable over a long period of time due to outgassing and alignment shifts arising from aging and temperature cycling. Laser weld techniques are reliable but use costly ferrulization of the fiber and specially designed mounts or clips to allow weld attachment of the ferrulized fiber. The mounts and clips tend to be relatively large, and may creep over time.

Solder attachment techniques, which have become prevalent in the art, may be more reliable and less costly. Laser soldering techniques also reduce the chance of static discharge that may potentially damage the components. Laser soldering techniques however, require relatively high amounts of laser power. A significant amount of the laser's power may be lost or wasted due to the highly reflective nature of the solder surface. The large amount of power used by the laser in a typical laser coupling process makes such a process relatively expensive compared, for example, with an epoxy coupling process. This cost may be reduced by supplying an additional low cost energy source near the solder such as an inductive heating source, a direct heater or a thermo-electric cooler (TEC). These low cost energy sources however, do not enable specific target soldering within a small space without affecting the surrounding area. The additional equipment may also add complexity to the system. Further, the additional equipment may be expensive.

SUMMARY OF THE INVENTION

To reduce the amount of laser power required during the laser coupling process, it may be desirable to use the lost or wasted energy reflected by the solder preform to help heat the solder preform. For this reduction in laser power, a simple, inexpensive apparatus is needed.

The present invention is embodied in an exemplary energy collector used to assist a laser coupling process. The energy collector includes an energy collector tip that is placed at a location near a device attaching element during the process so that the collector tip receives laser energy reflected from the device attaching element. The energy collector tip is formed from a material that converts the reflected laser energy to heat.

The present invention is also embodied in a system used in a laser coupling process. The system includes a laser and an energy collector coupled to the laser. The energy collector includes an energy collector tip that is placed at a location near a device attaching element during the laser coupling process so that the collector tip receives laser energy reflected from the device attaching element. The energy collector tip is formed from a material that converts the reflected laser energy to heat.

The present invention is also embodied in a method for reducing the amount of power used by a laser for coupling a plurality of components. The exemplary method includes placing a device attaching element on a surface and placing an energy collector proximate to the device attaching element. The energy from a laser beam that is reflected off of the device attaching element is collected by the energy collector. The method creates sufficient coupling between the energy collector and the surface to provide a thermally conductive pathway for the energy between the energy collector and the device attaching element. The method then uses the collected energy of the laser beam to assist in modifying the device attaching element.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1A:
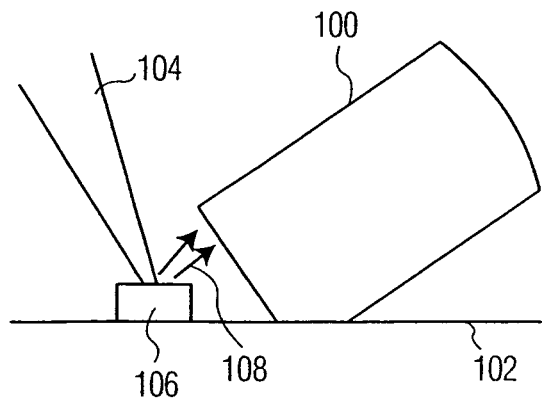
FIG. 1A is a is a side plan drawing illustrating an exemplary energy collector, including an area of physical contact between the exemplary energy collector and a surface that provides sufficient thermal coupling according to one embodiment of the invention.

FIG. 1A shows an exemplary embodiment of the invention. As shown, laser beam 104 irradiates device attaching element 106 which is located on surface 102. Laser energy 108 is reflected from device attaching element 106 in different directions. Energy collector tip 100 is proximate to device attaching element 106 so that at least a portion of the laser energy 108 is collected by energy collector tip 100. Energy collector tip 100 is also in contact with surface 102. The precise location of energy collector tip 100 and the area of collector tip 100 that is in contact with surface 102 shown in FIG. 1 is merely illustrative and is not limiting.

It is contemplated that the device attaching element may be made of a number of different materials used during a laser coupling process, which have the desired thermal and mechanical properties. It is noted that the desired thermal and mechanical properties may vary depending on the type of components which are being coupled. These materials may include solder, thermally cured epoxy, ultraviolet (UV) cured epoxy, and air-cured epoxy. Exemplary solder preforms may desirably be formed of any solder alloy which has the desired thermal and mechanical properties, such as glass solder, lead-tin solder, gold-based solder, indium-based solder, gallium-based solder, bismuth-based solder, cadmium-based solder, or lead-free solder, wherein the solder preform may be with or without flux.

It is contemplated that the energy collector tip may be made of a number of different materials which have desired thermal and mechanical properties. It is noted that the desired thermal and mechanical properties may vary depending on the type of components used during the laser coupling process. Desirably, an energy collector tip is made up of materials with thermal conductivity sufficient to heat an area proximate to the device attaching element to a predetermined temperature less than 100 ms after the laser beam begins to irradiate the device attaching element and sufficient to cool the area proximate to the device attaching element to a predetermined temperature less than 100 ms after the laser beam stops irradiating the device attaching element. Exemplary energy collector tips may desirably be formed of any material which has the desired thermal and mechanical properties, such as iron, steel or ceramic.

Figure 2:
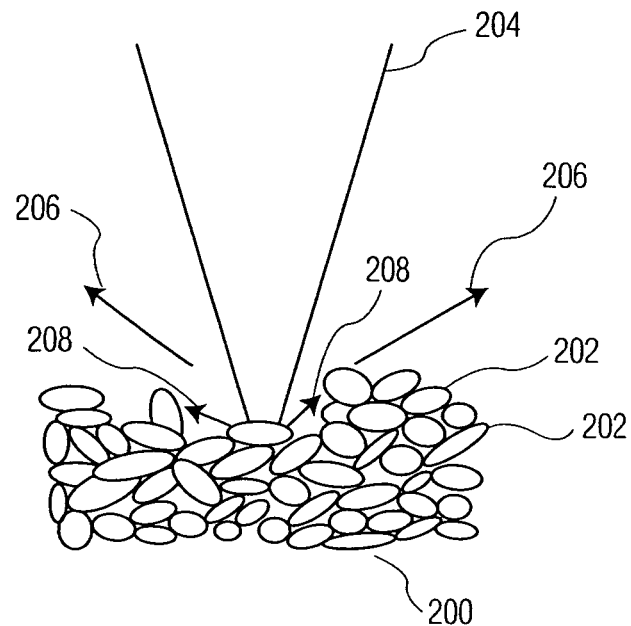
FIG. 2 is a front plan drawing of an exemplary solder preform with a porous surface that may be used during a laser coupling process according to one embodiment of the invention.

Referring to FIG. 2, it may be desirable to use a solder preform that is less reflective to further reduce the amount of laser power required during the laser coupling process. FIG. 2 illustrates an exemplary solder preform with a porous surface. As shown in FIG. 2, solder preform 200 is formed from multiple smaller solder chips 202. Desirably, solder chips 202 have diameters in the sub-micron range. Solder chips 202 form a more porous surface on solder preform 200. While laser energy 206 from laser beam 204 is reflected from solder preform 200, laser energy 208 is absorbed by solder preform 200 which helps to heat the solder preform. A porous solder preform may be made by placing solder chips 202 into a metal die cast.

Figure 6:
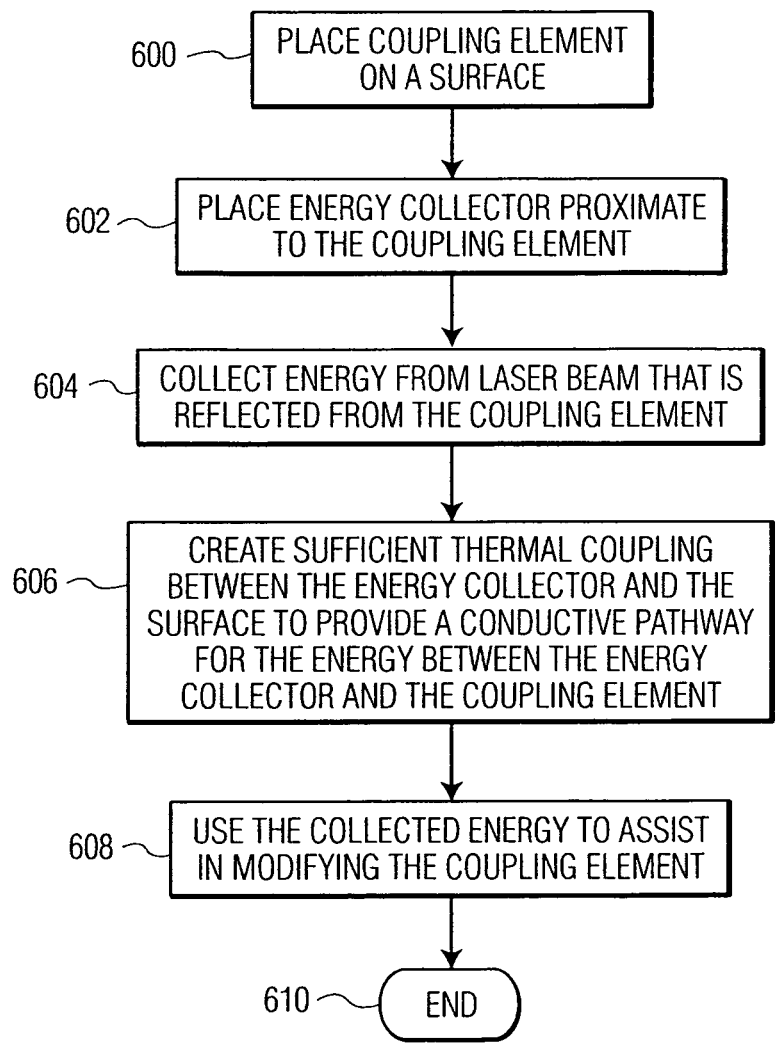
FIG. 6 is a flowchart illustrating an exemplary method for collecting energy reflected from a device attaching element and using the collected energy to assist in modifying the device attaching element according to one embodiment of the present invention.

FIG. 6 is a flow chart diagram illustrating an exemplary method for collecting energy reflected from a device attaching element and using the collected energy to assist in modifying the device attaching element. At step 600, a device attaching element is placed on a surface. Next, the user places an energy collector tip proximate to the device attaching element at step 602. The exact location of the energy collector tip may be determined from various factors. For example, as described below, the location may be determined by energy collector tip material. The exact location of the energy collector tip may also be determined by the amount of laser energy reflected from the device attaching element that the user desires to collect with the energy collector tip. The user may place the energy collector tip at a location such as shown in FIG. 1A. Alternatively, the user may desire to place the energy collector tip closer to the device attaching element to collect more laser energy reflected from the device attaching element as shown, for example, in FIG. 3.

Laser energy is collected from a laser beam that is reflected from a device attaching element, at step 604. The amount of energy collected may be determined by the location of the energy collector tip as described above. The amount of energy collected may also be determined by the material that forms the energy collector tip. As described above, it is contemplated that the energy collector tip may be made of a number of different materials which have desired thermal and mechanical properties that may vary depending on the type of components used during the laser coupling process.

Figure 1B:
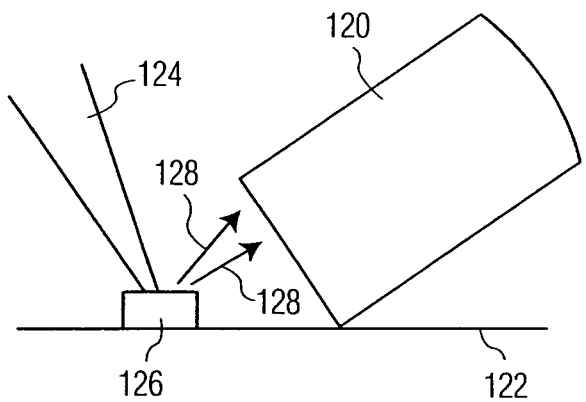
FIG. 1B is a side plan drawing illustrating another exemplary energy collector, including a smaller area of physical contact between the exemplary energy collector and a surface that provides sufficient thermal coupling according to one embodiment of the invention.

At step 606, sufficient thermal coupling is created between the energy collector and the surface to provide a conductive pathway for the energy between the energy collector and the device attaching element. Sufficient thermal contact may be determined from various factors, including the material that makes up the energy collector, the material that makes up the surface, the power of the laser and the amount of time used to heat and cool the area proximate to the device attaching element as described above. For example, an energy collector with a greater area of physical contact will conduct heat through the surface to the device attaching element in a shorter amount of time than one with a smaller contact area. The user may determine that physical contact between the energy collector and the surface may be desirable for sufficient thermal coupling as shown, for example, in FIG. 1A. FIG. 1B illustrates another exemplary embodiment of the invention. As shown, the area of energy collector tip 120 is also in physical contact with surface 122. The area of physical contact shown in FIG. 1B however, is smaller than the area of physical contact shown in FIG. 1A. A mechanism may be used to apply force to the energy collector tip to ensure good physical contact between the energy collector tip and the surface. The mechanism for applying the force to create the area of physical contact may include a spring which biases the energy collector tip toward the surface. It is contemplated however, that other methods for applying the force may be used.

Figure 3:
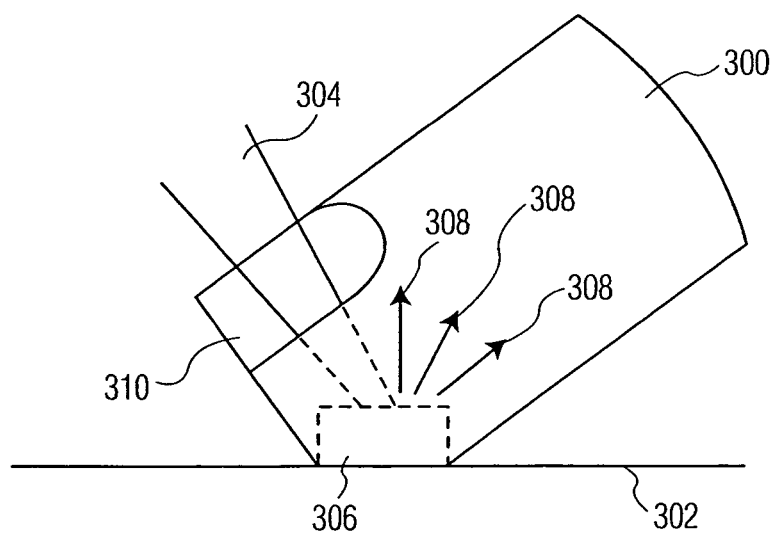
FIG. 3 is a side plan drawing illustrating another exemplary energy collector that partially surrounds a device attaching element and includes an opening for a laser beam to pass through and irradiate the device attaching element according to one embodiment of the invention.

FIG. 3 illustrates another exemplary embodiment of the invention. As shown in FIG. 3, energy collector tip 300 is placed on surface 302 and partially surrounds device attaching element 306. Energy collector tip 300 includes opening 310 enabling laser beam 304 to pass through and irradiate device attaching element 306. Laser energy 308 is reflected from device attaching element 306 and collected by energy collector tip 300. Because it completely surrounds the device attaching element 306, the exemplary embodiment shown in FIG. 3, may collect a greater amount of energy than the exemplary embodiments shown in FIG. 1A, FIG. 1B and FIG. 1C.

Figure 1C:
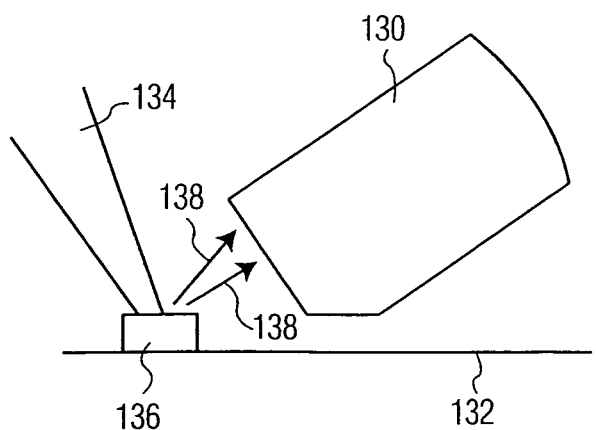
FIG. 1C is a side plan drawing illustrating another exemplary energy collector that is placed near a surface with no physical contact between the exemplary energy collector and the surface that provides sufficient thermal coupling according to one embodiment of the invention.

FIG. 1C illustrates another exemplary embodiment of the invention. As shown in FIG. 1C, energy collector tip 130 is not in physical contact with surface 132. The user may determine that energy collector tip 130 however, is placed at a distance from surface 132 so that there is sufficient thermal coupling, for example via radiational coupling, between energy collector tip 130 and surface 132.

Figure 4:
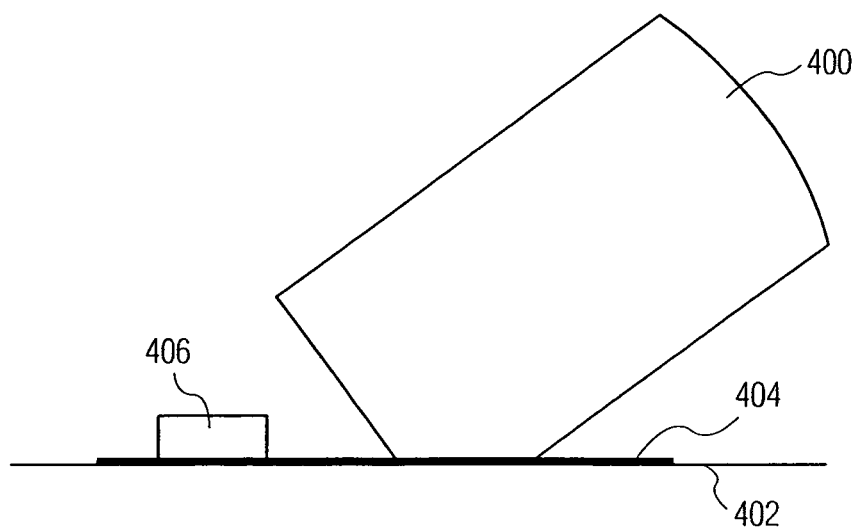
FIG. 4 is a side plan drawing illustrating another exemplary energy collector that is placed on a surface that includes a thermally conductive coating according to one embodiment of the invention.

Thermal coupling may also be increased by placing a thermally conductive coating on the surface and/or on the surface of the energy collector. FIG. 4 illustrates another exemplary embodiment of the invention, which includes energy collector 400 and device attaching element 406 placed on an area of thermally conductive coating 404. Thermally conductive coating 404 may also be a factor for determining sufficient thermal contact. For example, the user may desire a smaller area of physical contact between the energy collector tip and the surface or may desire to place an energy collector tip near the surface if there is a thermally conductive coating because the thermally conductive coating may conduct heat through the surface to the device attaching element in a shorter amount of time.

Figure 5:
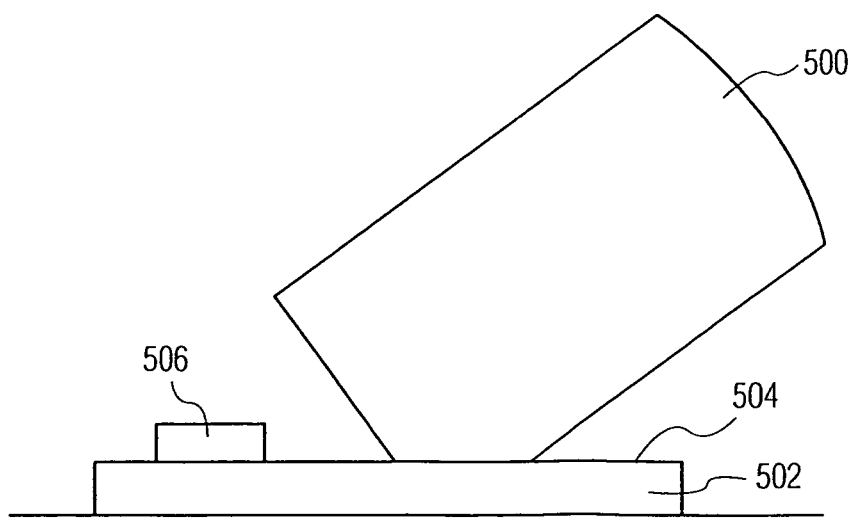
FIG. 5 is a side plan drawing illustrating another exemplary energy collector that is coupled to a top surface of an attachment pad according to one embodiment of the invention.

FIG. 5 illustrates another exemplary embodiment of the invention, which includes an attachment pad 502. Energy collector 500 is placed on a top surface 504 of attachment pad 502. Device attaching element 506 is also placed on attachment pad 502. A thermally conductive coating (not shown) may also be placed on attachment pad 502.

Referring back to FIG. 6, at step 608, the collected energy is used to assist in modifying the device attaching element. As described above, the energy collector tip may be made of materials having thermal conductivity sufficient to heat an area proximate to the device attaching element to a predetermined temperature less than 100 ms after the laser beam begins to irradiate the device attaching element and sufficient to cool the area proximate to the device attaching element to a predetermined temperature less than 100 ms after the laser beam stops irradiating the device attaching element. Although it is contemplated that the collector tip may be made up of materials with different thermal properties, at least one property convert the laser energy reflected from the device attaching element to heat. Although the energy collector tip is described as converting energy reflected from the device attaching element to heat, it is contemplated that it may also convert energy directly applied to the collector tip to heat.

After the laser energy is converted to heat energy (heat), the heat may be used to help modify the device attaching element during the laser coupling process. As described above, sufficient thermal coupling is created between the energy collector and the surface to provide a conductive pathway for the heat to travel between the energy collector and the device attaching element so as to heat the surface near the device attaching element. Therefore, the laser energy collected by the energy collector is used to help in the modification process which may result in a more homogeneous heating of the device attaching element.

Figure 7:
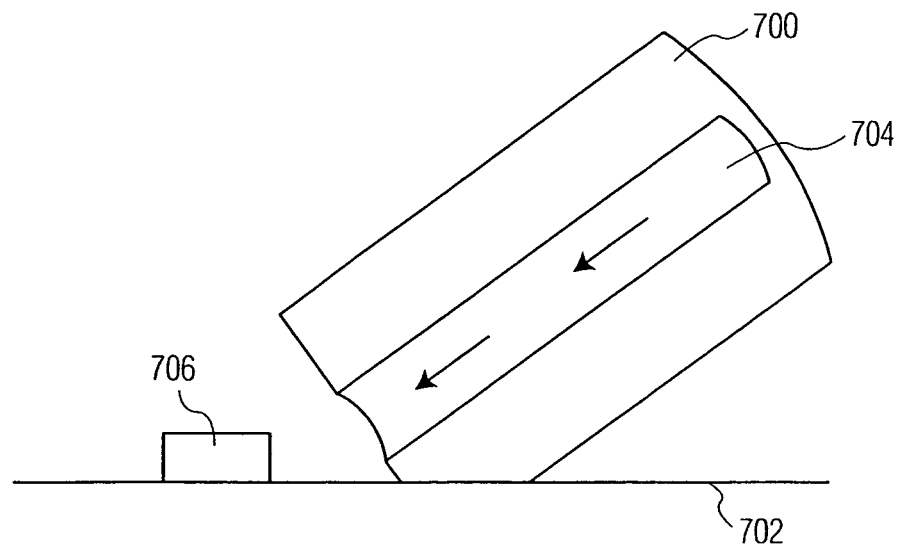
FIG. 7 is a cut-away side plan drawing illustrating an exemplary energy collector, cut along a center line of the exemplary energy collector and including a channel to provide a pathway for gas to flow.

Referring to FIG. 7, it may be desirable to provide a gas to an area near the device attaching element to assist in the process for heating the device attaching element more homogeneously. The gas that is provided to the area near the device attaching element may be heated by heat at the surface or heat from the device attaching element. The gas however, may be heated more homogeneously than the surface or the device attaching element which has become heated from the energy collected by the energy collector and the laser energy absorbed by the device attaching element. Therefore, the gas may assist in heating the device attaching element more homogeneously during the laser coupling process. FIG. 7 is a cut-away side plan drawing illustrating an exemplary energy collector, cut along a center line of the exemplary energy collector and including a channel to provide a pathway for gas to flow. As shown in FIG. 7, energy collector 700 is placed on surface 702 and includes channel 704 which provides a pathway for gas to flow from energy collector 700 to an area proximate to device attaching element 706 to assist in modifying the device attaching element. Exemplary sources of gas may use inert gases that do not chemically react with the surrounding elements such as the energy collector, surface material or the device attaching element. Exemplary gases may be, for example, nitrogen, argon, or carbon-monoxide.

It may be desirable to heat the gas before it reaches the area proximate to the device attaching element. The gas may be heated before it enters the channel in the energy collector. Alternatively, or in addition the gas may be heated by the heat from the energy collector as it passes through the channel. It is also contemplated that the gas may be applied to the area proximate to the device attaching element without using a channel in the energy collector. A gas which is not sent through a channel may be heated prior to reaching the area near the device attaching element. After the collected energy has been used to assist in the modification of the device attaching element, the process end at step 610.

It may also be desirable to provide a gas to assist in the cooling process. The gas may be cooled to a predetermined temperature to enhance this process. The gas may be provided to the area proximate to the device attaching element without using a channel in the energy collector tip. Alternatively, the gas may be provided to an area proximate to the energy collector through the channel.

Various methods may be used to apply the heat used in the laser coupling process. For example, the user may modify a device attaching element by laser pulse heating. This exemplary method may provide very precise control of the location and volume of the device attaching element being modified. At least one pulse of laser light from a pulsed laser source, such as a pulsed direct diode laser may be used to irradiate the modified device attaching element. A number of parameters may be used for determining laser types, ranges of power, pulse widths and wavelengths such as the material of the device attaching elements, the material of the energy collector, the proximity of the energy collector to the device attaching element and the efficiency of the coupling process being used, but in any case it is desirable for the pulses of laser light incident on the device attaching element to have a fluence that is less than the ablation threshold of the material of the device attaching element. It has been found that a direct diode laser with a laser beam having an output power in the range of about 20 W to 40 W, wavelengths in the range of about 800 nm to about 1000 nm and pulse widths in the range of about 100 ms to about 1 s, perform well for modifying device attaching elements formed of a fluxless glass solder.

Figure 8:
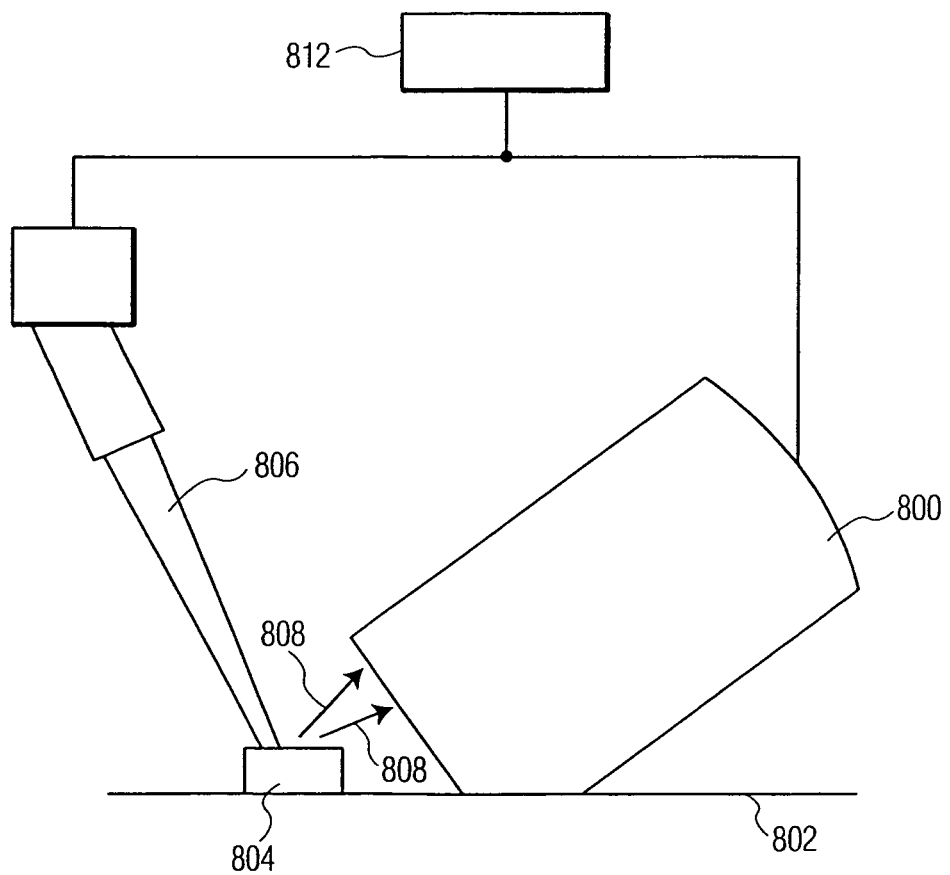
FIG. 8 is a side plan drawing illustrating an exemplary system that includes a laser, an energy collector and a controller coupled together according to one embodiment of the present invention.

Referring to FIG. 8, it may be desirable to use a system during the laser coupling process where the laser and the energy collector are coupled together. As shown in FIG. 8, energy collector 800 is placed on surface 802 and proximate to device attaching element 804 to collect laser energy 808 reflected from device attaching element 804. Energy collector 800, laser 810 and controller 812 are coupled together. Controller 812 may be configured to control the movement of energy collector 800, the movement of laser 810 and/or the pulse width and output power of laser beam 806. Controller 812 may configured to control laser 810 and energy collector 800 so that they are rigidly coupled and the movements of laser 810 and energy collector 800 are dependent on each other. It may also be desirable for controller 812 to be configured so that laser 810 and energy collector 800 move independently of each other. For example, the energy collector 800 may be moved to be aligned with device attaching element 804 at a desired location for collecting laser energy 808 reflected from device attaching element 804. Alternatively, laser 810 may be moved after energy collector 800 has been aligned with device attaching element 804 to collect laser energy 808 reflected from device attaching element 804.

It may be desirable to keep the energy collector stationary and move the device attaching element to align the device attaching element with the energy collector. The device attaching element may be on the surface of a substrate or an attachment pad and the movement of the device attaching element may include moving the substrate or the attachment pad to align the device attaching element with the energy collector. A controller may be configured to move the device attaching element along an x-y plane or in three dimensions so that the device attaching element is aligned with the energy collector.

An energy collector tip holder may also be coupled to an energy collector tip. The energy collector tip holder may include a mechanism for applying force to the energy collector tip to create sufficient thermal coupling between the energy collector tip and the surface, as described above. The energy collector tip holder may also be used to couple the energy collector to a controller. As described above, an energy collector tip is desirably made up of materials with thermal conductivity sufficient to heat an area proximate to the device attaching element to a predetermined temperature less than 100 ms after the laser beam begins to irradiate the device attaching element and sufficient to cool the area proximate to the device attaching element to a predetermined temperature less than 100 ms after the laser beam stops irradiating the device attaching element. It is noted however, that the desired thermal properties may vary depending on the type of components used during the laser coupling process. Therefore, exemplary energy collector tip holders may be made of a number of different materials which have the desired thermal properties. For example, the energy collector tip holder could be made up of materials with a greater conductivity than the energy collector tip to assist in the cooling process. Alternatively, the energy collector tip holder could be made up of materials with less conductivity which acts as an insulator and assists in the heating process.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An energy collector used to assist a laser coupling process, the energy collector comprising:
an energy collector tip configured to be placed proximate to a device attaching element during the laser coupling process, wherein:
the energy collector tip is configured to receive laser energy reflected from the device attaching element during the laser coupling process;
the energy collector tip is formed from a material that converts the laser energy reflected from the device attaching element to heat, and
the energy collector tip includes a surface configured to transfer the converted heat to the device attaching element.

2. An energy collector according to claim 1, further including a mechanism for applying force to the energy collector tip to create thermal contact between the energy collector tip and a surface and to provide a thermally conductive pathway for the collected energy between the energy collector tip and the device attaching element.

3. An energy collector according to claim 1, further comprising an energy collector tip holder coupled to the energy collector, wherein the material that forms the energy collector tip holder has at least the same thermal conductivity of the energy collector tip to assist in cooling an area proximate to the device attaching element when the laser energy is no longer applied.

4. An energy collector according to claim 1, further comprising an energy collector tip holder coupled to the energy collector, wherein the material that forms the energy collector tip holder has a thermal conductivity less than energy collector tip to assist in heating an area proximate to the device attaching element when the laser energy is applied.

5. An energy collector according to claim 1, wherein the energy collector includes a channel which provides a pathway for a gas to flow from the energy collector tip to an area proximate to the device attaching element.

6. An energy collector according to claim 1, wherein the material that forms the energy collector tip has a thermal conductivity sufficient to heat an area proximate to the device attaching element to a predetermined temperature less than 100 ms after the laser beam begins to irradiate the device attaching element and sufficient to cool the area proximate to the device attaching element to a predetermined temperature less than 100 ms after the laser beam stops irradiating the device attaching element.

7. An energy collector according to claim 1, wherein the material that forms the energy collector tip includes at least one of iron, steel or ceramic.

8. An energy collector according to claim 1, wherein the energy collector tip at least partially surrounds the device attaching element and the collector tip includes an opening such that the laser beam may pass through the opening and irradiate the device attaching element.

9. A system used in a laser coupling process, the system comprising:
a laser;
an energy collector coupled to the laser, the energy collector including:
an energy collector tip configured to be placed proximate to a device attaching element during the laser coupling process, wherein:
the energy collector tip is configured to receive laser energy reflected from the device attaching element during the laser coupling process; and
the energy collector tip is formed from a material that converts the laser energy reflected from the device attaching element to heat and transfers at least a portion of the heat to the device attaching element; and
a controller which moves at least one of the energy collector, the device attaching element or the laser to one of a plurality of available positions with respect to each other, each of the plurality of available positions causing a respectively different amount of heat, converted by the energy collector, to be transferred to the device attaching element.

10. A system according to claim 9, the system further including a mechanism for applying force to the energy collector tip to create sufficient thermal contact between the energy collector tip and a surface to provide a conductive pathway for the collected energy between the energy collector tip and the device attaching element.

11. A system according to claim 10, wherein the mechanism for applying force to the energy collector tip includes a spring which biases the energy collector tip toward the surface.

12. A system according to claim 9, wherein the laser is rigidly coupled to the energy collector.

13. A system according to claim 9, wherein the laser is coupled to the energy collector so that the laser and energy collector move independently of each other.

14. A system according to claim 9, wherein at least one of the energy collector or the device attaching element is moved to align the energy collector with the device attaching element.

15. A system according to claim 9, wherein the device attaching element is formed of at least one of glass solder, lead tin solder, gold-based solder, indium-based solder, gallium-based solder, bismuth-based solder, cadmium-based solder, lead-free solder, thermally cured epoxy, air-cured epoxy or ultraviolet cured epoxy.

16. A system according to claim 9, wherein the device attaching element is formed of a solder preform including a plurality of sub-micron solder chips.

17. A system according to claim 9, wherein the laser beam has a wavelength in the range of about 800 nm to about 1000 nm.

18. A system according to claim 9, wherein the laser beam has a power in the range of about 20 W to 40 W.

19. A system according to claim 9, wherein the laser beam has a pulse length in the range of about 100 ms to about 1 s.

20. A system according to claim 9, wherein the surface at which sufficient thermal contact is created is a top surface of an attachment pad and the device attaching element is located on the top surface of the attachment pad.

21. A system according to claim 9, wherein the energy collector tip and the device attaching element are disposed at different portions of a surface and the surface includes a thermally conductive coating.

22. A system according to claim 9, wherein the energy collector includes a channel that provides a pathway for a gas to flow from the energy collector tip to an area proximate to the device attaching element.

23. A system according to claim 22, the system further including a source of gas coupled to the channel.

24. A system according to claim 22, wherein the gas is selected from a group consisting of nitrogen, argon, or carbon-dioxide.

25. An energy collector according to claim 1, wherein the energy collector tip and the device attaching element are disposed at different portions of a surface; and
   an area of the collector tip that is in thermal contact with the surface is sufficient for transferring the converted heat from the collector tip to the device attaching element through the surface.

* * * * *